United States Patent [19]

Newell

[11] Patent Number: 4,763,784
[45] Date of Patent: Aug. 16, 1988

[54] DEVICES FOR PREVENTING UNAUTHORIZED USE OF VIDEO-CASSETTES

[75] Inventor: Terence J. Newell, Leicester, England

[73] Assignee: Video Cassette Lock (UK) Limited, Leicester, England

[21] Appl. No.: 915,799

[22] PCT Filed: Dec. 9, 1985

[86] PCT No.: PCT/GB85/00560

§ 371 Date: Sep. 4, 1986

§ 102(e) Date: Sep. 4, 1986

[87] PCT Pub. No.: WO86/04180

PCT Pub. Date: Jul. 17, 1986

[30] Foreign Application Priority Data

Jan. 7, 1985 [GB] United Kingdom ............... 8500337

[51] Int. Cl.⁴ .......................................... B65D 85/672
[52] U.S. Cl. .................................. 206/387; 206/389; 70/14; 242/199
[58] Field of Search ................... 206/387, 389, 391; 242/199; 70/14

[56] References Cited

U.S. PATENT DOCUMENTS

| 4,304,331 | 12/1981 | Minkow | 206/387 |
| 4,322,000 | 3/1982 | Struble | 206/387 |
| 4,406,426 | 9/1983 | Crandall | 206/389 |
| 4,527,405 | 7/1985 | Renick et al. | 70/14 |
| 4,567,983 | 2/1986 | Morris | 206/387 |
| 4,634,004 | 1/1987 | Mortensen | 206/387 |
| 4,714,161 | 12/1987 | Thorud | 206/387 |

FOREIGN PATENT DOCUMENTS

| 139181 | 5/1985 | European Pat. Off. . |
| 8327644 | 2/1984 | Fed. Rep. of Germany . |
| DE34015-43A1 | 7/1985 | Fed. Rep. of Germany . |
| 2545305 | 4/1983 | France . |
| WO83/02846 | 8/1983 | PCT Int'l Appl. . |
| WO84/02422 | 6/1984 | PCT Int'l Appl. . |
| 2138778A | 10/1984 | United Kingdom . |

*Primary Examiner*—Joseph Man-Fu Moy
*Attorney, Agent, or Firm*—Paul A. Beck; Buchanan Ingersoll

[57] ABSTRACT

A conventional video cassette comprises a tape transport mechanism (1) comprising two reels each with an internally splined tape drive hole, contained in a protective housing (2). The protective housing (2) of the cassette is provided with two circular access holes through which the tape drive holes of the reels can be accessed, and normally the reels themselves are pressed into firm contact with the underside of the cassette protective housing (2) by a leaf spring (3). The device (10) of the invention can be inserted into either of the internally splined tape drive holes and pushed downwardly with compression of the associated leaf spring (3) of the video cassette until the underside of the protective housing (2) is exposed. Thereafter detent members (15) engage beneath the protective housing (2), and the device can be removed from the tape drive hole only by an authorized person using a key (17).

10 Claims, 6 Drawing Sheets

DEVICES FOR PREVENTING UNAUTHORIZED USE OF VIDEO-CASSETTES

DESCRIPTION

1. Field of Invention

The invention is in the field of video-cassettes to try and ensure use of a video-cassette by an authorised person only.

2. Background

Various devices have been proposed for preventing the unauthorised playing of video tapes on a video cassette recorder/playback unit. Some proposals have sought to inactivate the recorder/playback unit, as with U.S. Pat. No. 4,527,405 (Renick) which relates to a dummy cassette that can be locked into the tape loading opening of the recorder/playback unit, this inactivating the unit. Disadvantages of this solution are that the use of the recorder/playback unit is prevented for all recordings, not merely for selected recordings which are intended to have a limited audience; and that loss of the key when the dummy cassette is locked in position can render the recorder/playback unit unusable. It will be appreciated that this is a significantly more onerous penalty than simply the inability to load and use one specific cassette.

A more relevant solution is one that inactivates individual cassettes, thus enabling a parent, for example, to impose a degree of censorship and prevent young members of a family from viewing material thought to be unsuitable. Devices have been proposed which prevent removal of the video cassettes from their storage or library cases. Such devices provide a very low level of security, however, as the library case can easily be forced open without damage to the cassette. If such forcing damages or destroys only the library case, then that is no deterrent to the potential unauthorised user, as the tape transport mechanism in its protective housing is likely to be undamaged.

Recent proposals have been directed to the provision of security means associated with the tape cassette itself. British Patent Application No. 2,138,778 A (Dunne) proposes the use of a bung which is a friction-fit in the splined holes of the tape reels of the tape transport mechanism. If a cassette fitted with such a bung were loaded into a video cassette recorder/playback unit, then sensors provided on the unit would fail to recognize the necessary pair of splined drive holes and a cassette ejection mechanism would be activated. Such sensors and ejection mechanism are provided on all video recorders to check against the mistaken loading of the cassette upside-down. The most significant disadvantage of the Dunne proposal is that because the bung is simply a friction fit it can easily be removed using a pointed instrument without damage to the cassette, so that the level of security is extremely low.

A slightly higher level of security is inherent in the propsal of French Patent Application No. 2,545,305 A (Drahi) which proposes the insertion of a key-lockable member into the optical sensor access hole of a video cassette. A standard cassette comprises a circular recess in its underside, having a diameter of 12 mm. When the cassette is lowered into a video recording/playback unit, an optical sensor of the video unit is received in this recess, and through lateral openings in the wall of the circular recess senses whether a video tape is present in the cassette. The optical sensor is designed to distinguish between the presence and absence of opaque video tape within the cassette, so as to stop the recording/playback unit either when the transport leader or trailer tape is reached or when there is a brake in the tape. It is not, however, designed to sense whether or not the circular recess is provided in the cassette. Therefore when this recess is blocked with a plug insert, as in Drahi, and the cassette is loaded into a video recorder/playback unit, the cassette handling mechanism of the unit pushes the plug insert down onto the optical sensor, thus placing a strain on the optical sensor of the video recorder/playback unit which it is not designed to resist. This can seriously damage that sensor.

Drahi specifically teaches that, of the recesses available in a video cassette, it is preferred to design the plug insert to fit the optical sensor recess. This recess is provided with lateral passages which form shoulders beneath which the locking bolt can engage. None of the other recesses in a conventional video cassette have such lateral passages, although there are others which have similar internal shoulders beneath the surface of the cassette. Also the optical sensor recess straddles a cooperating non-circular shallow groove in the cassette case so that a rotary key can be used to lock and release the plug insert, obtaining its reaction or purchase from a nose of the plug insert received in the groove. Also the optical sensor recess is the largest diameter recess in the cassette case to have such internal shoulders and a cooperating groove. Even so, the maximum diameter of any plug insert made according to the teachings of Drahi is 12 mm, being the diameter of the optical sensor recess in a standard cassette. This is barely sufficient to house a reliable lock mechanism. Drahi therefore proposes a bolt which is optionally spring-biassed to the retracted position and which requires the use of a key both to advance and to retract the bolt. It follows that the lock mechanism disclosed in Drahi, even in the preferred embodiment illustrated, is one that could be released very easily using a pin, wire or pointed instrument to rotate the barrel either assisted by the bias of the spring or, if the optional spring is omitted, without any counter-bias.

There therefore remains a need for a device for preventing the unauthorized use of a video cassette which provides a high degree of security, which cannot be removed or inactivated using normally available household implements, and which does not cause damage to the video recorder/playback unit. The present invention provides such a device, making use of features of conventional video tape cassettes which were not appreciated by Dunne or Drahi. The invention is believed to be original first in its use of those features of a conventional cassette, as detailed below; secondly in the general method used for providing enhanced security using simple devices; and thirdly in the ingenious mechanisms of the device which ensure reliable operation and sufficient security have regard to the purpose of the invention.

SUMMARY OF THE INVENTION

The invention thus provides a device for preventing unauthorised use of a video-cassette by blanking off the internally splined tape drive hole of a tape transport reel of the video-cassette to prevent unauthorised use of the cassette, CHARACTERISED IN THAT a blanking body shaped to fit the tape drive hole is provided with at least one detent mounted to pass between the tape transport reel of the cassette and the underside of a protective housing of the cassette on compression of the spool tensioning spring by the tape transport reel; and key-release means for effecting retraction of the detent or detents to permit removal of the blanking body. The device can be unobstrusively inserted inside a tape drive hole of a video cassette, and lock in position without adding to the overall bulk of the cassette or interfering with its storage in a library case. Upon insertion of the cassette into the video recorder/playback unit with the device in position, the video recorder/playback unit will reject the cassette using its existing safety mechanisms which detect the accessibility of the two tape drive holes in the video cassette. When a cassette protected by a device according to the invention is rejected by a video recorder/playback unit there is no strain on any of the parts of the unit, as the existing safety mechanism are designed specifically to sense the presence and accessibility of the two drive holes, so that at no stage is the cassette lowered forcefully against any fragile or sensitive parts of the unit. No modification of the cassette, cassette library case or video unit is thus required and the device can be sold in shops as an accessory for both BETAMAX (Trade Mark) and VHS (Trade Mark) type video cassettes.

It is not apparent from a visual inspection of a video tape cassette how the device of the invention is able to lock so positively into the tape drive holes. The hole into which the device is inserted has no visible shoulder beneath which a detent can engage. The bung of Dunne was simply a friction fit. However the Applicants have made use of the fact that the reels of the tape transport mechanism of a standard cassette are spring-mounted. A spool tensioning spring beneath each reel biases it into close contact with the opposite wall of the protective housing. Depression of this spring permits sufficient movement of the reel, without damage to the tape transport mechanism, to allow the one or more detents of the device to pass between the depressed reel and the underside of the protective housing, to allow a secure and positive locking of the device to the protective housing.

Advantageously this engagement of the detent or detents with the underside the protective housing is permitted only when there is full compression of the spool tensioning spring, so that the device cannot be depressed further into the tape drive hole after locking has been achieved. The or each detent is preferably biased radially outwardly into its locking position by resilient means incorporated into the device. The taper which is conventionally moulded into the cassette protective housing around the tape drive holes as a centering aid is advantageously used as a cam surface to cam the detent or detents radially inwardly against the bias of the resilient means as the device is pushed axially down into the tape drive hole. On the underside of the protective housing, the detent or detents spring out under the bias of the resilient means to lock the device in position. By making the detent or detents sufficiently strong, the device cannot be removed without a key except by breaking the protective housing or dismantling the entire cassette.

Advantageously one or more pairs of detents are provided, the detents of each pair being slidable in diametrically opposite directions to engage beneath diametrically oppostie parts of the protective housing. In such a configuration, the resilient means biasing the detents outwardly may simply comprise a resilient portion of each detent coacting with the diametrically opposed detent so that the two detents are mutually biased apart.

The key-actuated release means is made surprisingly simple by shaping the device to engage in a non-rotatable manner with the tape drive hole of the tape transport mechanism. Where such a release means requires a turning movement of a key for release of the device, the device is held against rotation, while the key is being turned, by the tape locking mechanism of the video-cassette. Commercially available video-cassettes have inbuilt mechanisms to hold the tape transport reels against rotation except when in use, and the above feature takes advantage of this to secure the device against rotation whilst the key is operated for releasing the locking means.

A variety of detent and release mechanisms may be used. However the purpose of this invention is such that the device must be cheap and that there is no great need for absolute security as the cassettes can always be dismantled to extract the spool if serious theft is contemplated.

Thus preferably the device comprises a hollow cylindrical bottom shell portion which is received in use in one of the tape drive holes of the tape transport mechanism; a central spindle upstanding within the bottom shell portion; and a barrel within the bottom shell portion and pivotable about the spindle. Teeth upstanding from the barrel are engageable by a key placed around the spindle, and rotation of the barrel effects retraction of the one or more detents to permit the device to be removed from the cassette.

Advantageously the teeth upstanding from the barrel have their opening faces inclined at a low angle to their direction of movement so as to make it difficult to rotate the barrel with a wire. Engagement of the key with the faces of all teeth around the pin is needed before the resulting frictional force overcomes the tendency for the key to slide over the surface of the teeth. Such a construction would have a considerable resistance to attempts to remove the device using a pin, wire or sharp instrument.

Simplicity of construction and a smooth and functional outer shape can be achieved if the device comprises a first moulding defining a cylindrical bottom shell for fitting inside the video-cassette tape drive hole, and an integral top plate for fitting flush with the protective housing of the video cassette and closely cooperating with the tapered edge of the hole surrounding the tape drive hole; one or more second mouldings defining detent means slidably mounted in a transverse slot formed in the top plate portion of the first moulding; a third moulding comprising key-releasable locking means received inside the bottom shell of the first moulding via a base opening therein for selective movement of the detend means; and a fourth moulding comprising a base closure plate for the bottom shell of the first moulding. It is believed that this reduces the number of parts to a minimum, and because all such parts may be injection-moulded from thermoplastics material, use of non-magnetic or non-magnetizable metal materials can be easily avoided.

The devices may be sold in packs of identical devices for use by a particular person with a single key or identical keys.

Devices with different keys may be colour-coded or carry lock identification letters or numbers to enable the members of the household to distinguish the cassettes. The codings need not identify the matching keys in all particulars but merely identify them sufficiently to enable the devices from one pack to be readily recognised even if the key varies from one pack to another.

DRAWINGS

In the drawings FIGS. 1 to 10 illustrate a first embodiment of a device according to this invention and FIGS. 11 to 16 illustrate a second embodiment.

In FIG. 1 only a part of the video-cassette is shown, also in section;

Figure 1:
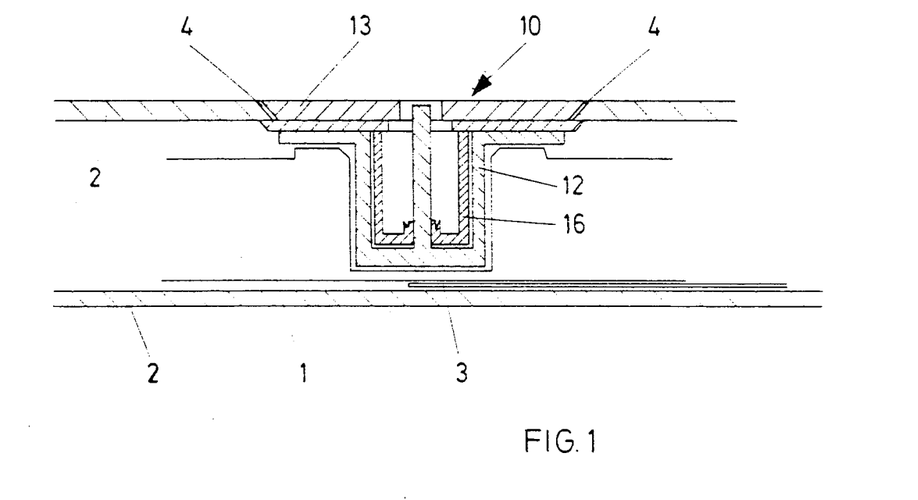
FIG. 1 is an axial section through a device according to this invention, in position in a video cassette where it blocks off one of the tape drive holes of the tape transport mechanism.
Figure 2:
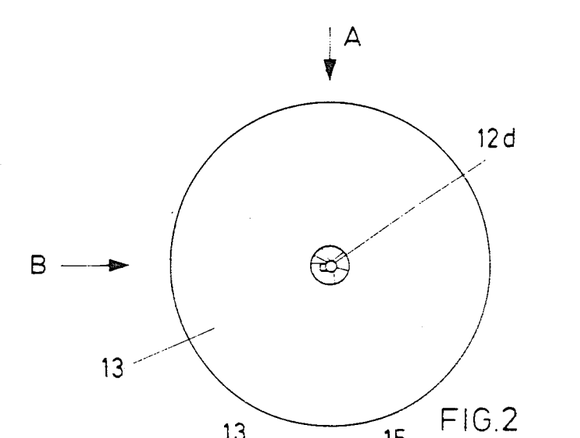
FIG. 2 is a plan view from above of the device of FIG. 1, the video-cassette being omitted.

Referring first to FIG. 1 which shows the first embodiment of the device of the invention in position in a video-cassette, there can be identified a tape transport mechanism 1 of the cassette in its protective housing 2. A leaf spring 3 biases the tape transport mechanism 1 upwardly as viewed, and the edge of the protective housing 2 around the tape drive hole of the tape transport mechanism 1 is provided with a downwardly and inwardly tapering edge 4 to assist location of the cassette accurately in a video recorder. All of this is common to any video-cassette, whether of a BETAMAX or VHS type.

Inserted into the tape drive hole of the cassette of FIG. 1 is a device 10 according to this invention. The device 10 fully blocks the tape drive hole so that if the cassette is loaded into a cassette recorder, the automatic eject mechanism will fail to identify the cassette as being properly loaded, and the eject mechanism will automatically be actuated.

The device of the invention comprises five separate mouldings each of thermoplastics material, which incorporate locking means which in this embodiment engage beneath the underside of the protective housing so as to retain the device in the position shown in FIG. 1. The video-cassette can be stored in its library case because the device is contained wholly within the protective housing 2 and does not increase the effective bulk of the cassette. Moreover the device 10 can be removed only by the use of the key provided (as will later be explained) or by dismantling or destruction of the cassette itself. The device therefore affords a very effective inhibition to casual mis-use of the video-cassette, at a low cost and with a small number of separately moulded parts. Furthermore from the description below it will be seen that there are no metallic parts used at all, so that use of the device does not endanger the material recorder on the video tape by the introduction of magnetic of magnetizable materials into the zone of the tape.

Referring next to FIGS. 1 to 7 generally, it will be seen that the device 10 comprises a first moulded part 12 which comprises an annular portion 12a, a generally cylindrical boss portion 12b and an array of axial splines 12c around the boss portion 12b. The splines 12c are intended to mate with the internal splines of the tape drive hole of the tape transport mechanism of a conventional video-cassette.

Figure 3:
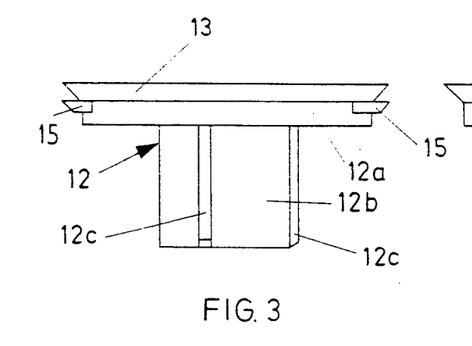
FIGS. 3 and 4 are side views of the device of FIG. 2, viewed in the directions of arrows A and B respectively.
Figure 4:
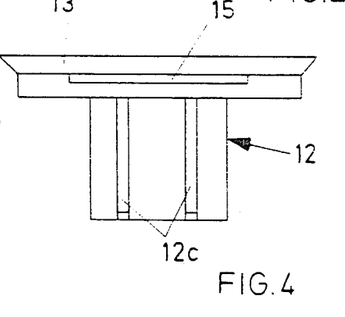
Figures 5, 6, 7:
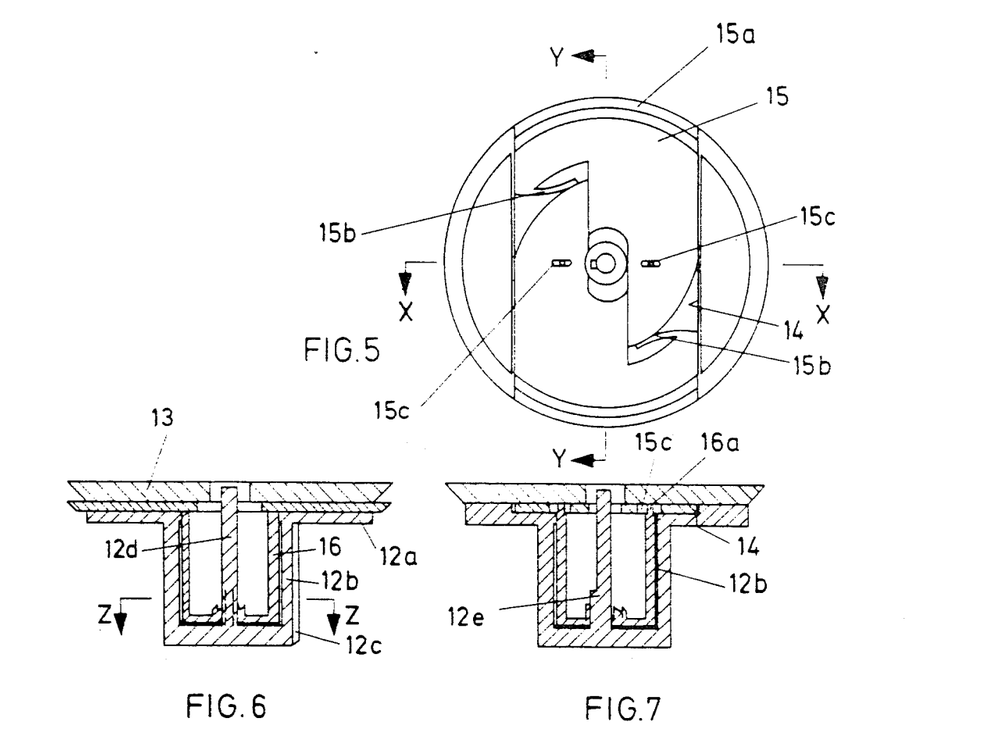
FIG. 5 is a schematic plan view similar to that of FIG. 2, but showing the positions of certain internal parts of the locking means of the device.
FIGS. 6 and 7 are respectively axial sections through the device of FIG. 5, taken in the planes X—X and Y—Y respectively.

From one to nine splines 12c may therefore be provided, although in the illustrated embodiment only three are shown (see in particular FIGS. 3 and 4).

A second moulded part 13 comprises a top plate which is secured over the annular portion 12a of the first moulded part so as to leave radial channels 14 therebetween as shown in FIG. 4. Detent members 15 are radially slidable in these channels 14, and as can best be seen in FIG. 5 each detent member 15 comprises an identical moulding of thermoplastics material so that the detent members 15 can be considered as third moulded parts of the device. Each detent member 15 comprises a tapered leading edge 15a for engagement beneath the protective housing 2 of the video-cassette, and an integrally moulded resilient portion 15b which engages the trailing edge of the other detent member 15 of the pair, to bias the detent members radially outwardly in opposite directions from the channel 14. A small hole 15c is moulded into each detent member 15, for engagement by pin means of a release barrel 16, as will be described below.

It will be seen from FIG. 1 that the taper around the edge of the second moulded part 12 cooperates exactly with the tapered surface 4 of the housing of the video-cassette, and that the annular portion 12a of the second moulded part and the protective housing 2 of the video-cassette are of exactly the same thickness. The result is that the device 10 when in position in the video-cassette lies exactly flush with the housing 2, with no cracks or openings around the edge of the device which might enable an unauthorised user to insert a blade to try to prise or break out the device.

Upstanding centrally from the base of the boss portion 12b of the first moulded part 12 is a central spindle 12d which is moulded integrally with the remainder of the first moulded part. A single short spindle 12e is formed on the spindle 12d, near to its base. A fourth moulded part comprises the release barrel 16 referred to above, which sits in the hollow interior of the boss portion 12b over the spindle 12d, and is capable of a limited amount of rotation (approximately 90°) until further rotation is prevented by the spline 12e.

Figure 8:
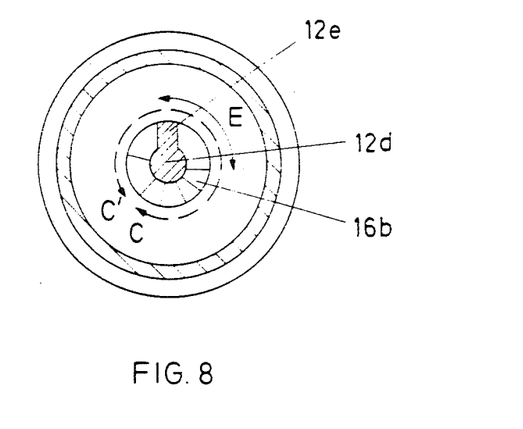
FIG. 8 is an enlarged (for the purpose of clarity) section taken along the plane Z—Z of FIG. 6.
Figure 9:
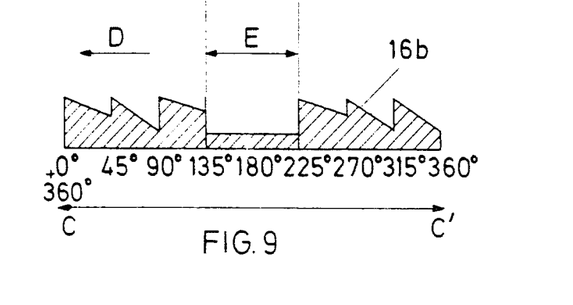
FIG. 9 is a projection elevation of the tooth layout of the barrel of the device, with the 180° of arc C-C' of FIG. 8 being laid out as a linear projection.
Figure 10:
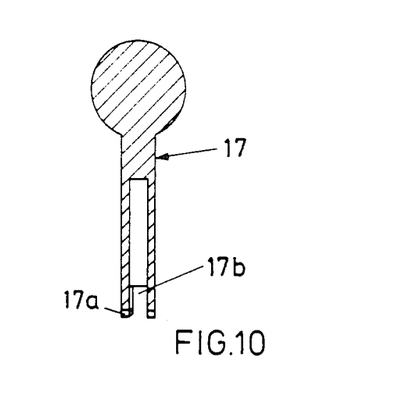
FIG. 10 is an axial section through the key needed to remove the device of the previous figures from a video-cassette housing.

Integrally moulded with the release barrel 16 are two pin portions 16a each of which is received in an appropriate one of the moulded holes 15c of the pair of detent members 15, so that rotation of the barrel is accompanied by withdrawal of the detent members 15 into their radial channel 14. Also integrally moulded with the release barrel 16 is an annular array of upstanding tapered teeth 16b arranged in a circle closely around the central spindle 12d of the first moulded part. The shape of these teeth will be understood from the comparison of the enlarged section of FIG. 8 and the projected tooth elevation of FIG. 9. The direction of movement of the release barrel 16 needed to effect withdrawal of the detent members 15 is indicated by the arrow D in FIG. 9, from which it will be seen that engagement of a key with the tapered surfaces of the teeth, and not with vertical surfaces, is needed to effect the necessary turning of the barrel 16. The angle of the tapered surfaces can easily be designed such that only when a key is used that cooperates with all or substantially of the tapered surfaces can sufficient frictional force be generated to effect the turning of the barrel. Thus a fifth moulded part of the device 10 of the invention comprises a moulded key 17 as shown in FIG. 10 around the base of which are moulded appropriate teeth 17a. In use the key is inserted over the spindle 12d until cut out portions 17b is received over the spline 12e. In this location, the teeth 17a of the key 17 mate closely with the upstanding projections 16b, permitting turning of the release barrel 16 through an angle of 90° as permitted by the space E (FIG. 9) in the ring of upstanding projections 16b, into which space the short spline 12e is located.

In use, the device simply has to be inserted in the central drive hole of either reel of the tape transport mechanism 1 of the video-cassette, and pushed axially downwards against the bias of the leaf spring 3 until the detent members 15 engage beneath the protective housing 2 of the cassette. Advantageously this engagement is achieved only on complete compression of the leaf spring 3 against the underside of the protective housing 2. This ensures that there is no free movement or slack in the location of the device, which might permit an unauthorised use to insert a knife blade or similar between the top plate 13 and the tapered wall 4 of the protective housing 2.

Authorised removal of the device is permitted by insertion of the key 17 over the spindle 12d, and turning through up to 90° while exerting a downwards pressure on the key to maintain good frictional contact between the teeth and the tapered surfaces of the projections 16b. The leaf spring 3, which is the spool tensioning spring of the video-cassette, biases the device upwardly so that it can be removed from the video-cassette tape drive hole when the detent members 15 are fully retracted.

As so far described, the device of the invention can be inserted and locked in any standard video-cassette without modification to either the device or the cassette. This is seen as a distinct advantage, although it is also contemplated that some manufacturers of video-cassettes may prefer to modify the design of the cassette so that only the resulting modified cassettes will accept a device according to the invention. This is readily achieved by shaping the base of each of the internally splined tape drive holes of the tape transport mechanism 1 so that it is non-planar. Corresponding shaping of the underside of the boss portion 12b of the device of the invention ensures that only such a modified device can be used with that particular video-cassette; otherwise the device cannot be pushed sufficiently deeply into the central hole of the tape transport mechanism 1 to achieve latching of the detent members 15 beneath the protective housing 2.

Referring next to the embodiment of FIGS. 11 to 16, it will be appreciated that the operation of this second device according to the invention is entirely analogous to that already described, although its detailed construction and manner of assembly differs. The second embodiment comprises four injection-moulded parts. A first moulding 102 (FIGS. 11 and 12) comprises a top plate 102a and an integral cylindrical boss portion 102b which together have the same shape and dimensions as the first and second moulded parts 12 and 13 of FIG. 1. A principal difference is that the boss portion 102b has an open base which is referred to below, for insertion of a cylindrical barrel 104 analogous to the barrel 16 of FIG. 1.

Figure 11:
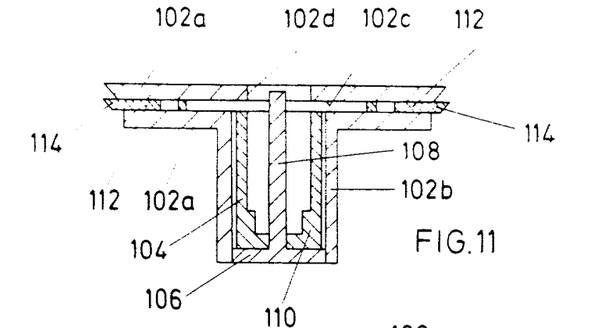
FIG. 11 is an axial section through a second device according to this invention.
Figures 12, 13, 14, 15, 16:
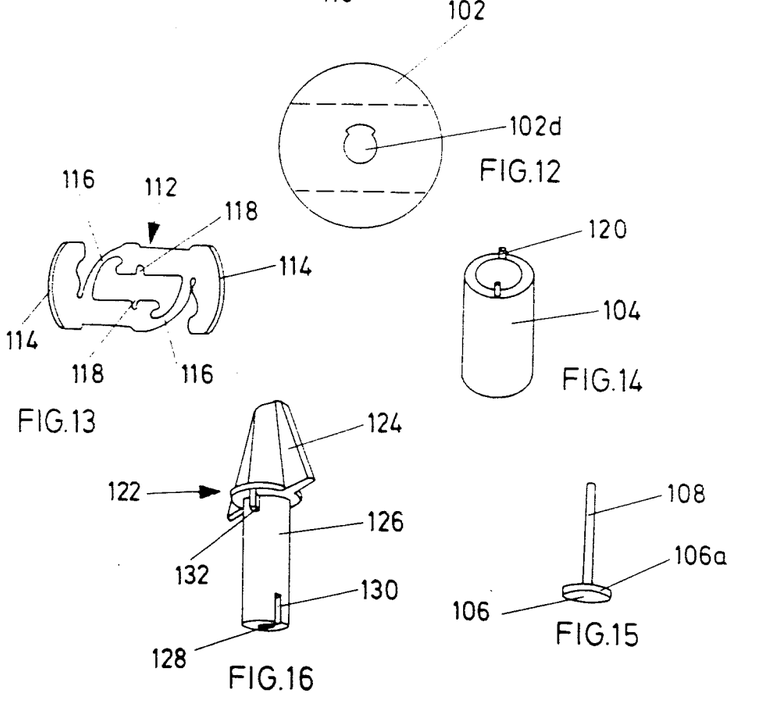
FIG. 12 is a plan view from above of the main body moulding of the device of FIG. 11.
FIG. 13 is a plan veiw from above of a unitary detent moulding of the device of FIG. 11, in which two detent portions are moulded in one piece with resilient means biasing them mutually apart.
FIG. 14 is a perspective view of a barrel used as a detent actuating member in the device of FIG. 11.
FIG. 15 is a perspective veiw of a closure plate for closing a base opening in a bottom shell of the main body moulding of the device of FIG. 1 and for providing a journal spindle for the barrel of FIG. 14.
FIG. 16 is a perspective veiw of a key for removing the device of FIG. 11 from a tape drive hole of a video-cassette.

Formed in the top plate 102a is a transverse guide channel 102c which extends diametrically across the top plate 102a as shown in broken lines in FIG. 12. The channel 102c receives a detent moulding 112 which has a pair of shaped detend edges 114 protruding in use from the recess as shown in FIG. 11. The detent edges 114 of the moulding 112 are joined together by resilient webs 116 which in use bias the edges 114 resiliently apart but which can flex to permit the edges to move mutually together in use as the device is inserted into or removed from a video-cassette tape drive hole.

Assembly of the device is achieved by first sliding the detent moulding 112 laterally into the transverse guide channel 102c from one end thereof, then inserting the cylindrical barrel 104 into the boss portion 102b from below, and finally pushing a closure plate 106 into position to close the open base of the boss portion 102b. The closure plate 106 is moulded with an integral stem portion 108 which acts as a journal for the barrel 104 and ultimately for the key. The closure plate 106 is formed with a small peripheral flange 106a which is a snap fit in an undercut groove (not shown) of the boss portion 102b, to hold the assembly together.

The detent moulding 112 is formed with two small recesses 118 which is use receive upstanding moulded pins 120 formed on the barrel 104. Turning of the barrel 104 through up to 90° causes the pins 120 to bear on the side walls of the recesses 118 to move the detent edges 114 mutually together. The barrel 104 may be turned by means of a key 122 which is injection moulded from thermoplastics material and which comprises a handle or gripping portion 124, a cylindrical stem 126 with a hollow centre 128 for receiving the stem portion 108 of the closure plate 106, and an annular array of spline recesses 130. The spline recesses 130 of the key are made to mate with an asymmetric array of internal splines 110 moulded into the barrel 104, to match the key to the barrel.

A lug 132 is moulded onto the key 122 as shown in FIG. 16, and in use cooperates with a quadrant-shaped cut-out portion of a key opening 102d formed in the top plate 102a, to limit the angular movement of the key. In this way it is ensured that the key 122 does not turn the barrel 104 so far that the pins 120 escape from the recesses 118.

What is claimed is:

1. A device for preventing unauthorised use of a video-cassette comprising a cassette, an internally splined tape drive hole of said video-cassette, blanking off said drive hole of the video-cassette to prevent unauthorised use of the cassette, characterised in that a blanking body (12) shaped to fit the tape drive hole in said video-cassette is provided with at least one detent (15) mounted to pass between the tape transport reel of the cassette, and an underside of a protective housing (2) of the cassette on compression of the spool tensioning spring by the tape transport reel; and key-release means (16) for effecting retraction of the said at least one detent (15) to permit removal of the blanking body (12).

2. A device according to claim 1 in which the at least one detent (15) is biased radially outwardly into its locking postion by resilient means (15B) and is arranged to engage a bevelled annular edge (4) of the protective housing (2) of the cassette around the tape drive hole, to be cammed radially inwardly as the device is pushed into the tape drive hole.

3. A device according to claim 1 further characterised in that the blanking body (12) and detent (15) are arranged so that the detent can just engage the housing underside with the spool tensioning spring substantailly fully depressed.

4. A device according to any claim 1 or 2 or 3, further characterised in that the body (12) has means engaging between splines of the tape drive hole to prevent relative rotation therebetween, and the release mechanism (16) is a rotary mechanism, the blanking body (12) being held against rotation by the tape lock mechanism of the video-cassette.

5. A device according to claim 4, further characterised in that the release mechanism (16) has surface configurations (16B) engageable by the key, comprising a spline or profile on a central annular portion of the barrel (16), around an axial spindle integral with the blanking body (12).

6. A device according to claim 4, further characterised in that the release mechanism (16) surface configurations (16B) engageable by the key, comprising a plurality of annularly arranged teeth or holes on or in the bottom of the barrel (16).

7. A device according to claim 6, further characterised in that the surface configurations are arranged so that a turning of the key (17) to release the device is only possible on applying as downward pressure on the key (17), onto the bottom of the barrel (16), to establish frictional contact with cooperating teeth thereon.

8. A device according to any one of claims 1–3 and 9 or 10, further characterised in that the detents (15) are provided in one or more pairs, the detents of the or each pair being mutually biased apart and slidable in diametrically opposite directions to engage beneath diametrically opposite parts of the protective housing (2).

9. A device according to claim 1, further characterised in that the blanking body comprises a first moulding (102) defining a cylindrical bottom shell (102b) for fitting inside the video-cassette tape drive hole, and an integral top plate (102a) for fitting flush with the protective housing of the video cassette and closely cooperating with the tapered edge of the hole surrounding the tape drive hole; one or more second mouldings (112) defining detent means slidably mounted in a transverse slot (102c) formed in the top plate portion (102a) of the first moulding (102); a third moulding (104) comprising key-releasable locking means received inside the bottom shell (102b) of the first moulding (102) via a base opening therein for selective movement of the detent means (112); and a fourth moulding comprising a base closure plate (106) for the bottom shell (102b) of the first moulding (102).

10. A device according to claim 9, further characterised in that the key-releasable means received inside the bottom shell of the first moulding comprises one or more third mouldings (15) defining detent means slidably mounted between the first and second mouldings (12, 13) and a fourth moulding (16) comprising a member movable on key operation to coact with the detent means and move them to their retracted positions.

* * * * *

UNITED STATES PATENT AND TRADEMARK OFFICE
CERTIFICATE OF CORRECTION

PATENT NO. : 4,763,784
DATED : August 16, 1988
INVENTOR(S) : TERENCE J. NEWELL

It is certified that error appears in the above-identified patent and that said Letters Patent is hereby corrected as shown below:

Column 2, line 3, change "brake" to --break--.

Column 2, line 4, underline the word "not".

Column 4, line 55, change "detend" to --detent--.

Column 6, line 18, change "recorder" to --recorded--.

Column 7, line 45, change "use" to --user--.

Column 8, line 25, change "detend" to --detent--.

Column 8, line 45, change "is" to --in--.

Column 9, Claim 4, line 26, after "means" insert --(12c)--.

Signed and Sealed this

Tenth Day of January, 1989

*Attest:*

DONALD J. QUIGG

*Attesting Officer*  *Commissioner of Patents and Trademarks*